United States Patent
Kamiya

(10) Patent No.: US 7,225,134 B2
(45) Date of Patent: May 29, 2007

(54) SPEECH INPUT COMMUNICATION SYSTEM, USER TERMINAL AND CENTER SYSTEM

(75) Inventor: Shin Kamiya, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 815 days.

(21) Appl. No.: 10/311,768

(22) PCT Filed: Jun. 18, 2001

(86) PCT No.: PCT/JP01/05174

§ 371 (c)(1),
(2), (4) Date: Feb. 14, 2003

(87) PCT Pub. No.: WO01/99096

PCT Pub. Date: Dec. 27, 2001

(65) Prior Publication Data

US 2004/0078202 A1    Apr. 22, 2004

(30) Foreign Application Priority Data

Jun. 20, 2000    (JP) .............................. 2000-184475

(51) Int. Cl.
*G10L 17/00* (2006.01)
(52) U.S. Cl. ..................... 704/275; 704/246
(58) Field of Classification Search ............ None
See application file for complete search history.

(56) References Cited

U.S. PATENT DOCUMENTS

| | | | |
|---|---|---|---|
| 4,987,596 A | 1/1991 | Ukita | |
| 5,848,389 A * | 12/1998 | Asano et al. | 704/239 |
| 5,983,177 A * | 11/1999 | Wu et al. | 704/244 |

FOREIGN PATENT DOCUMENTS

| | | |
|---|---|---|
| EP | 0423800 A2 | 4/1991 |
| JP | 60-7498 A | 1/1985 |
| JP | 3-132797 A | 6/1991 |
| JP | 3-221999 A | 9/1991 |
| JP | 6-32012 B2 | 4/1994 |
| JP | 6-95689 A | 4/1994 |
| JP | 7-141309 A | 6/1995 |
| JP | 8-6589 A | 1/1996 |
| JP | 2655086 B2 | 5/1997 |
| JP | 10-20883 A | 1/1998 |
| JP | 10-133847 A | 5/1998 |
| JP | 10-282990 A | 10/1998 |

* cited by examiner

*Primary Examiner*—Susan McFadden
(74) *Attorney, Agent, or Firm*—Birch, Stewart, Kolasch & Birch, LLP

(57) ABSTRACT

A user system incorporating a voice instruction recognition processing portion and a transmission control portion is connected through a communication line to a center system incorporating a reception control portion, a voice instruction recognition processing portion and an output control portion. Processing for obtaining a voice instruction content based on a waveform analysis result of the voice instruction is shared by voice instruction recognition processing portions. This share prevents decrease of a recognition rate occurred in the case of disposing a voice analysis recognition processing function only on the center system. The share also eliminates waiting time for transfer of lexical grammar data generated in the case of disposing the voice analysis recognition processing function only on the user system. Further, a processing load of the user system is decreased. Thus, high recognition capability is obtained even with voice input from a user terminal low in power consumption.

18 Claims, 10 Drawing Sheets

PHONEMIC LATTICE

PHONEMIC SIMILARITY PER ANALYTICAL FRAME

AVERAGE PHONEMIC SIMILARITY PER SET OF PLURAL ANALYTICAL FRAMES

SPEECH INPUT COMMUNICATION SYSTEM, USER TERMINAL AND CENTER SYSTEM

This application is the national phase under 35 U.S.C. §371 of PCT International Application No. PCT/JP01/05174 which has an International filing date of Jun. 20, 2000, which designated the United States of America.

TECHNICAL FIELD

The present invention relates to a voice-input communication system for performing information service through a communication line, communication service through home network, and device control through home network by voice.

BACKGROUND ART

Conventionally, there has been an information processing system enabling users to exchange information by voice through a communication line. FIG. 11 is a flowchart showing voice recognition/information processing operation by a conventional voice-input information processing system. FIG. 11 shows that a voice waveform is inputted in a user terminal side in the step S1. The inputted voice waveform data is transmitted to a center system side through a communication line in the step S2. Eventually, waveform analysis is conducted in the center system side in the S3. Then, there are performed phoneme recognition in the step S4, word recognition in the step S5, and sentence recognition in the step S6. Thus, in accordance with a voice-inputted sentence obtained as a result of language processing, application program is executed in the step S7.

In the conventional voice-input information processing system as described above, voice waveform data is transmitted to the center system side through a communication line, which causes distortion of a user's voice, thereby making voice recognition on the center system side difficult. Further, using unspecified speaker voice recognition to support a number of users generates a group of speakers low in recognition capability with a certain probability.

In order to solve the above-stated problem, there is a voice-input information processing system (e.g., Japanese Patent Laid-Open Publication HEI No. 8-6589) provided with a specified speaker voice recognition function or a speaker-adapted voice recognition function on the user terminal side, in which lexical grammar data necessary for recognition is transmitted from the center system side to the user terminal side through a communication line for performing voice recognition. FIG. 12 is a flowchart showing voice recognition/information processing operation by such voice-input information processing system.

In the step S11, lexical grammar data communication is carried out between the user terminal side and the center system side, by which lexical grammar data necessary for recognition is transmitted from the center system side to the user terminal side. A voice waveform is inputted in the user terminal side in the step S12. In the step S13, waveform analysis is conducted. There are performed phoneme recognition for speaker adaptation in the step S14, word recognition in the step S15, and sentence recognition and transmission of a recognition result to the center system side in the step S16. In accordance with a voice-inputted sentence obtained on the user terminal side, application program is executed on the center system side in the step S17.

However, the-above stated conventional voice-input information processing system provided by voice recognition function on the user terminal side suffers a following problem. More particularly, the voice-input information processing system is capable of implementing high voice recognition capability. However, every time application software is changed, lexical grammar data corresponding to respective application should be transmitted from the center system side to the user terminal side through a communication line, which causes a problem that annoying waiting time is generated for information transfer at the time of changing the application in the case where transmission speed of the communication line is slow compared to data quantity of the lexical grammar data.

Further, with the number of a lexis being over several thousands, it is necessary to increase the processing speed of a processor necessary for real-time processing, which generates a problem in terms of power consumption if the user terminal is a mobile device such as cell phones and PDA (personal digital assist).

DISCLOSURE OF INVENTION

An object of the present invention is therefore to provide a voice-input communication system capable of implementing high recognition capability even with voice input from a user terminal low in power consumption, as well as a user terminal and a center system for use in the voice-input communication system.

In order to accomplish the above object, the present invention provides a voice-input communication system having a user system with a user terminal and a center system being connected to the user system through a first communication line for sending an instruction from the user terminal to the center system, the voice-input communication system comprising:

voice instruction recognition processing means composed of a plurality of partial voice instruction recognition processing means having different functions for recognizing an instruction content from a result of waveform analysis of an inputted voice instruction, wherein the plurality of the partial voice instruction recognition processing means are dispersed to the user system and the center system.

According to the above configuration, unlike the case of placing all the functions of a voice instruction recognition processing means including a voice recognition function, a word recognition function and a sentence recognition function in the center system, it is not necessary to transmit an inputted voice waveform from the user system to the center system through the first communication line. This prevents a recognition rate of voice instructions from decreasing due to transmission distortion of the inputted voice waveform. Also unlike the case of placing all the functions of the voice instruction recognition processing means in the user system, it is not necessary to transmit lexical grammar data from the center system to the user system. This saves waiting time for transmitting the lexical grammar data at the time of changing voice instructions, thereby enabling prompt recognition of the voice instructions. Further, a recognition processing load of the user system may be reduced.

In one embodiment, the user system is provided with a user-side system connected to the user terminal through a second communication line, and the user-side system is connected to the center system through the first communication line.

According to the embodiment, a partial voice instruction recognition processing means retained by the user system may be dispersed between and held by the user terminal and the user-side system. This makes it possible to further reduce a recognition processing load of the user terminal and to increase the processing speed. As a result, the user terminal can accept voice instruction sentences of a large lexis even if the user terminal is a mobile device such as cell phones and PDA that are low in power consumption.

In one embodiment, the voice-input communication system comprises a plurality of the center systems, each of which is connected through a third communication line.

According to the embodiment, a partial voice instruction recognition processing means retained by the center system may be further dispersed among and held by a plurality of the center systems. Also, the center system executing voice instruction recognition processing may be separated from the center system executing application processing in accordance with a recognized instruction content. Further, an instruction may be sent by voice from the user terminal to different center systems.

In one embodiment, at least a final-stage center system is provided with output control means for outputting an instruction content recognized by the voice instruction recognition processing means.

According to the embodiment, at least a final-stage center system is capable of executing various application programs conforming to the content of an instruction outputted from the output control means.

In one embodiment, either the user terminal or the user-side system in the user system is provided with voice recognition means as the partial voice instruction recognition processing means for recognizing an inputted voice and outputting an interim recognition result, and provided with transmission control means for transmitting the interim recognition result to the center system through the first communication line.

According to the embodiment, in the user system, an inputted voice is recognized and an interim recognition result is provided by the voice recognition means, and the interim recognition result is transmitted to the center system by the transmission control means through the first communication line. Thus, the interim recognition result with less transmission distortion compared to the case of transmitting a voice waveform is transmitted through the communication line, which prevents a recognition rate from decreasing.

In one embodiment, at least one center system comprises: a lexical grammar memory for storing lexical grammar; and language processing means as the partial voice instruction recognition processing means for performing language processing of the interim recognition result from the user system with use of the lexical grammar.

According to the embodiment, in the center system provided with a lexical grammar memory and a language processing means, language processing of the interim recognition result from the user system is performed by the language processing means with use of the lexical grammar, so that wrong recognition candidates are removed and a linguistically-correct instruction content is attained. Thus, the correct instruction content of a voice instruction inputted from the user terminal may be obtained.

In one embodiment, the voice recognition means is phoneme recognition means, and the interim recognition result is a phonemic lattice or a syllabic lattice.

According to the embodiment, the interim recognition result with less transmission distortion compared to the case of transmitting a voice waveform may be easily obtained in the form of the phonemic lattice or the syllabic lattice.

In one embodiment, as the interim recognition result, a phonemic similarity series per analytical frame or an average phonemic similarity series per set of sequenced multiple analytical frames is used instead of the phonemic lattice.

According to the embodiment, as the interim recognition result, a phonemic similarity series per analytical frame or an average phonemic similarity series per set of multiple sequential frames are used to decrease a processing load of the phoneme recognition means. Consequently, the phoneme recognition means may be mounted on a user terminal low in processing capability.

In one embodiment, the first communication line is different in kind from the second and third communication lines.

According to the embodiment, for example, the first communication line for connecting the user system and the center system is set to be WAN (Wide Area Network) while the second communication line for connecting the user terminal and the user-side system in the user system, and the third communication line for connecting each center system are set to be LAN (Local Area Network), which makes it possible to send instructions by voice from different user terminals in a branch office to different center systems in a head office in Tokyo.

In one embodiment, the voice-input communication system comprises:

phonation instruction means provided on at least one center system for creating a voice synthesis control parameter for a phonation content to be phonated by a user and transmitting the parameter to the user system through the first communication line;

voice synthesis means provided on the user terminal in the user system for creating a synthetic voice with the phonation content based on the voice synthesis control parameter transmitted through the first communication line;

waveform analysis means provided on either the user terminal or the user-side system in the user system for extracting characteristics of an inputted voice through analysis of a waveform of the inputted voice and transmitting the characteristics to the center system through the first communication line; and speaker recognition means provided on the center system equipped with the phonation instruction means for recognizing a speaker based on the characteristics of the inputted voice transmitted through the first communication line.

According to the embodiment, based on a voice synthesis control parameter for the phonation content transmitted from the phonation instruction means in the center system, a synthetic voice with the phonation content is outputted by the voice synthesis means of the user system. Then, characteristics of the voice phonated by a user based on the phonation content by the synthetic voice are extracted by the waveform analysis means of the user system and transmitted to the center system. Then, a speaker is recognized based on the characteristics of the inputted voice by the speaker recognition means of the center system.

Thus, before a voice instruction by a user to the user terminal is recognized in the center system, text-specified speaker recognition is conducted between the user system and the center system through the first communication line. This enables execution of processing conforming to respective voice instructions only in the case of phonation instructions by a specified user.

The present invention provides a user terminal comprising: phoneme recognition means for recognizing an inputted voice per phoneme and creating a phonemic lattice; and transmission control means for transmitting the phonemic lattice through a communication line.

According to the above configuration, in transmitting an inputted voice through a communication line, a phonemic lattice, that is an interim recognition result, is transmitted. Therefore, unlike the case of transmitting an inputted voice waveform through the communication line, a recognition rate of the inputted voice will not be deteriorated by transmission distortion.

The present invention provides a center system for transmitting and receiving information to/from a user system through a communication line, comprising:

reception means for receiving a phonemic lattice transmitted through the communication line;

a lexical grammar memory for storing lexical grammar; and language processing means for performing language processing of the phonemic lattice with use of the lexical grammar.

According to the above configuration, language processing of a phonemic lattice, that is an interim recognition result transmitted from the user system through a communication line, is performed with use of a lexical grammar. Therefore, a recognition rate of the inputted voice will not be deteriorated due to transmission distortion unlike the case of performing voice waveform analysis, phoneme recognition, and language processing of an inputted voice waveform transmitted through the communication line.

BEST MODE FOR CARRYING OUT THE INVENTION

Hereinafter, the present invention will be described in detail in conjunction with embodiments with reference to drawings.

First Embodiment

Figure 1:
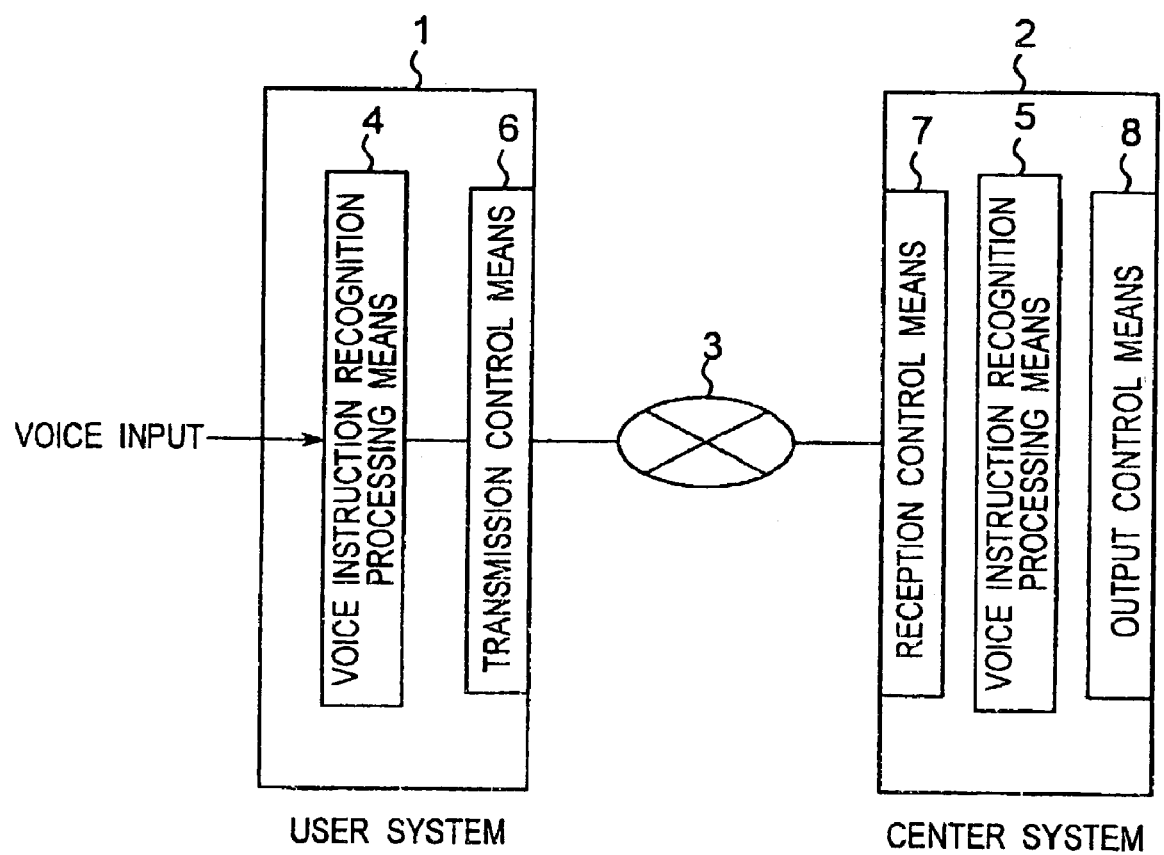
FIG. 1 is a block diagram showing a voice-input communication system of the present invention.

FIG. 1 is a block diagram showing a basic configuration of a voice-input communication system in the present embodiment. In FIG. 1, reference numeral 1 denotes a user system and reference numeral 2 denotes a center system. The user system 1 and the center system 2 are connected via a communication line 3.

The user system 1 and the center system 2 are equipped with voice instruction recognition processing means 4 and 5, respectively. The voice instruction recognition processing means 4 processes inputted voice data, while the voice instruction recognition processing means 5 further processes a processing result by the anterior voice instruction recognition processing means 4. Also, the user system 1 is equipped with a transmission control means 6 that transmits the processing result by the voice instruction recognition processing means 4 to the posterior center system 2 via a communication line 3. The center system 2 is equipped with a reception control means 7 that receives the processing result by the anterior voice instruction recognition processing means 4 via the communication line 3. The center system 2 is also equipped with an output control means 8 that outputs the processing result by the next voice instruction recognition processing means 5 as a voice instruction content.

Herein, the voice instruction recognition processing means 4, 5, the transmission control means 6, the reception control means 7, and the output control means 8 mounted on the user system 1 and the center system 2 may be configured by individual LSI (Large-Scale Integration). Alternatively, each of the user system 1 and the center system 2 may be configured by a peripheral terminal having CPU (Central Processing Unit) and a communication function. Further, the communication line 3 may be composed of either LAN or WAN, and may be wired or wireless. Description will hereinafter be given in the case where the communication line 3 is composed of WAN.

The voice instruction recognition processing means 4 and 5 mounted on the user system 1 and the center system 2 are structured to recognize an instruction inputted by voice to the user system 1 and obtain the voice instruction content as a whole. In that case, the voice instruction recognition processing means 4 of the user system 1 performs, for example, analysis of an inputted voice waveform and executes phoneme recognition or syllable recognition. Then, as an interim recognition result, a phonemic lattice or a syllabic lattice is outputted.

The voice instruction recognition processing means 5 of the center system 2 connected to the user system 1 through the communication line 3 composed of WAN performs, for example, language processing of the interim recognition result such as a received phonemic lattice or a syllabic lattice. Then, final voice instruction content is obtained.

It is allowable for the user system 1 and the center system 2 to divide each function of the incorporated voice instruction recognition processing means 4, 5 into plurality as a unit and to connect them via a communication line. It is also possible to add other processing systems. For example, as for the user system 1, the voice instruction recognition processing means 4 has an analysis function of inputted voice waveform and a phoneme recognition (or syllable recognition) function. Accordingly, the functions may be allotted to a first device incorporating a voice instruction recognition processing means for performing waveform analysis processing of an inputted voice and to a second device incorporating a voice instruction recognition processing means for performing phoneme recognition (or syllable recognition) processing, and the devices are connected via a communication line. The first device side incorporates a transmission control means for transmitting a waveform analysis result, while the second device side incorporates a reception control means for receiving the waveform analysis result.

It is to be understood, however, that allocation of processing by the voice instruction recognition processing means of the first device and the voice instruction recognition processing means of the second device in this case is not limited to those described above. For example, the voice instruction recognition processing means of the first device side simply digitizes an inputted voice waveform and outputs the processing result. Then, the voice instruction recognition processing means of the second device side may perform both the waveform analysis processing and the phoneme recognition processing (or syllable recognition processing), and may output an interim recognition result of a phonemic lattice (or syllabic lattice) as a processing result. In this case, using LAN and the like as a communication line between the first and the second devices makes it possible to minimize communication distortion of the voice waveform. Alternatively, the voice instruction recognition processing means of the first device side may perform both the waveform analysis processing and the phoneme recognition processing (or syllable recognition processing), and may transmit an interim recognition result of a phonemic lattice (or syllabic lattice) as a processing result to the second device side.

Also, as for the center system 2, the voice instruction recognition processing means 5 has a word recognition function and a sentence recognition function. Accordingly, the functions are allotted to a third device incorporating a voice instruction recognition processing means for performing word recognition processing and to a fourth device incorporating a voice instruction recognition processing means for performing sentence recognition processing. The devices are connected via a communication line. The third device side incorporate a transmission control means for transmitting a word recognition result (word lattice), while the fourth device side incorporates a reception control means for receiving the word recognition result.

It is to be understood, however, that allocation of processing by the voice instruction recognition processing means of the third device and the voice instruction recognition processing means of the fourth device in this case is not limited to those described above. For example, the voice instruction recognition processing means of the third device side performs both word recognition processing and sentence recognition processing, and outputs a voice instruction content as the processing result. Then, the voice instruction recognition processing means of the fourth device side transfers the received voice instruction content as it is to a control section for executing an application. Possibly, the voice instruction recognition processing means of the third device side transmits a phonemic lattice (or syllabic lattice) received from the user system 1 as it is to the fourth device. Then, the voice instruction recognition processing means of the fourth device side performs both word recognition processing and sentence recognition processing, and outputs a voice instruction content as the processing result. Alternatively, each of the voice instruction recognition processing means of the third device and the fourth device may perform both word recognition processing and sentence recognition processing and may output a voice instruction content as the processing result.

In the present invention as described above, in establishing a voice-input communication system for recognizing an instruction inputted by voice and for obtaining a voice instruction content, the user system 1 incorporating the voice instruction recognition processing means 4 and the transmission control means 6 is connected to the center system 2 incorporating the reception control means 7, the voice instruction recognition processing means 5, and the output control means 8 via the communication line (WAN) 3.

The voice instruction recognition processing means 4 of the user system 1 and the voice instruction recognition processing means 5 of the center system 2 share the processing of waveform analysis and recognition of an instruction inputted by voice and obtainment of a voice instruction content. This eliminates decrease of a recognition rate due to transmission distortion of voice waveform data as with the conventional case of disposing a voice analysis recognition processing device only on a center system side, thereby enabling obtainment of a high recognition result. Also, there is generated no waiting time due to transmission of lexical grammar data unlike the case of disposing a voice analysis recognition processing device only on the user system side, which enables prompt recognition processing of voice instructions. Further, a processing load of the user system 1 may be reduced, as a consequence of which voice instructions with a large lexis are acceptable even if a user terminal constituting the user system 1 is a mobile device such as cell phones and PDA that are low in power consumption.

Further at that time, the voice instruction recognition processing means 4 of the user system 1 conducts voice analysis recognition processing and outputs an interim recognition result such as phonemic lattices and syllabic lattices. Then, the interim recognition result is transmitted to the center side via the communication line (WAN) 3, so that language processing thereof is conducted on the center side. This makes it possible to decrease transmission distortion compared to the case of directly transmitting voice waveform data, which prevents a recognition rate from decreasing. Also, in the user system 1 and the center system 2, each function of the voice instruction recognition processing means 4, 6 mounted thereon may be divided into plurality as a unit and connected via a communication line. Also, addition of other processing systems is possible. In that case, there may be established a voice-input communication system that is more maneuverable and applicable to diversified needs.

It is to be understood that a dividing position of the user system 1 and the center system 2, a dividing position inside the user system 1, and a dividing position inside the center system 2 are not particularly limited. They should be determined such that a voice-input communication system to be established can carry out a targeted function in the most efficient manner in consideration of communication speed of a communication line to be connected, presence of communication distortion, communication fees, processing capacity of the voice instruction recognition processing means per division unit, processing data amount and weight thereof, and the like.

Second Embodiment

Hereinbelow, the above-structured voice-input communication system will be described in detail.

Figure 2:
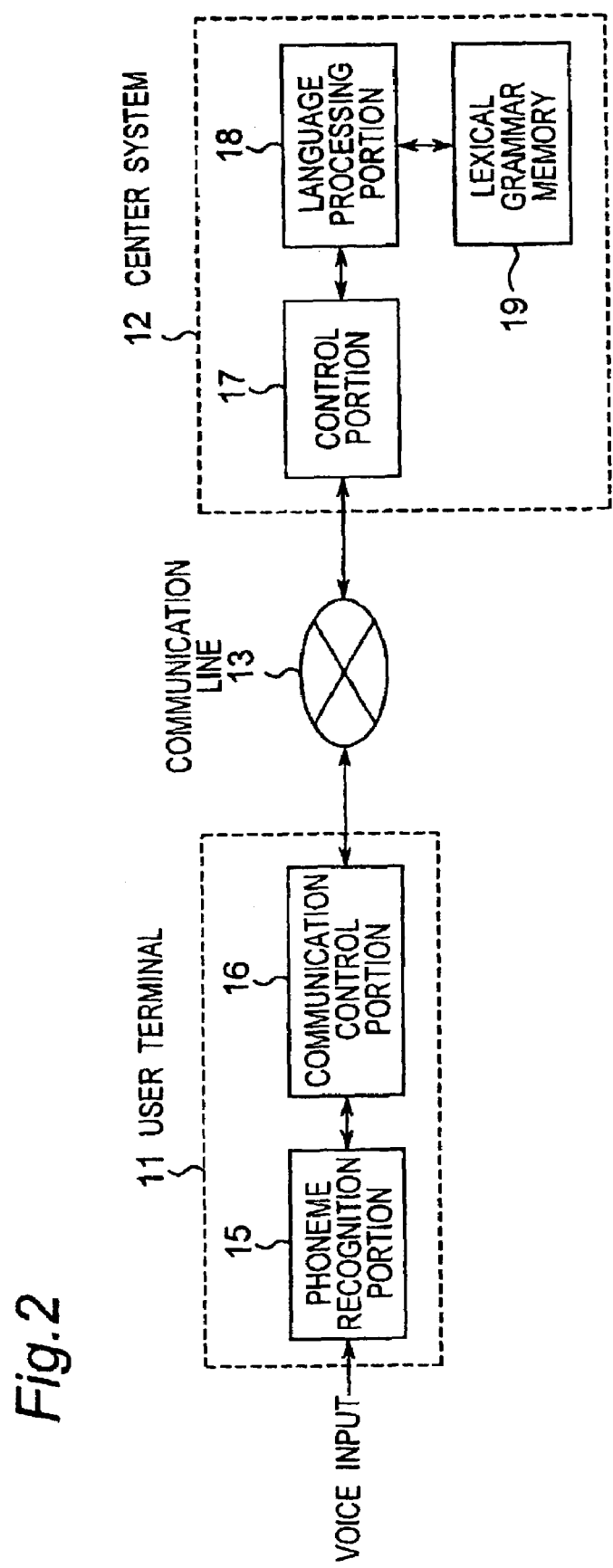
FIG. 2 is a concrete block diagram showing the voice-input communication system of FIG. 1.

FIG. 2 is a block diagram of a voice-input communication system in the present embodiment. The voice-input communication system embodies the voice-input communication system of the first embodiment as it stands, which is composed of a user terminal 11 and a center system 12.

The user terminal 11, which is an equivalence of the user system 1 of the first embodiment, is for inputting instructions by voice and for outputting an interim recognition result. The center system 12, which is connected to the user terminal 11 via a communication line (WAN) 13, is an equivalence of the center system 2 of the first embodiment for recognizing and outputting a voice instruction content.

The user terminal 11 has a phoneme recognition portion 15 and a communication control portion 16. The phoneme recognition portion 15 obtains a sound parameter time series from an inputted voice for recognizing a phoneme. Also, the communication control portion 16 controls connection between the phoneme recognition portion 15 and the communication line 13. More particularly, the phoneme recognition portion 15 constitutes the voice instruction recognition processing means 4 in the first embodiment, and the communication control portion 16 constitutes the transmission control means 6.

The center system 12 has a control portion 17, a language processing portion 18, and a lexical grammar memory 19. The small chamber 17 controls connection between the communication line 13 and the center system 12. The language processing portion 18 performs language processing of a phonemic lattice as an interim recognition result obtained by the phoneme recognition portion 15 transmitted from the user terminal 11 via the communication line 13 with use of the lexical grammar data stored in the lexical grammar memory 19, and recognizes an instruction sentence inputted by voice into the phoneme recognition portion 15. Then, the recognition result is returned to the control portion 17. More particularly, the control portion 17 constitutes the reception control means 7 in the first embodiment, and the language processing portion 18 constitutes the voice instruction recognition processing means 5 and the output control means 8.

Figure 3:
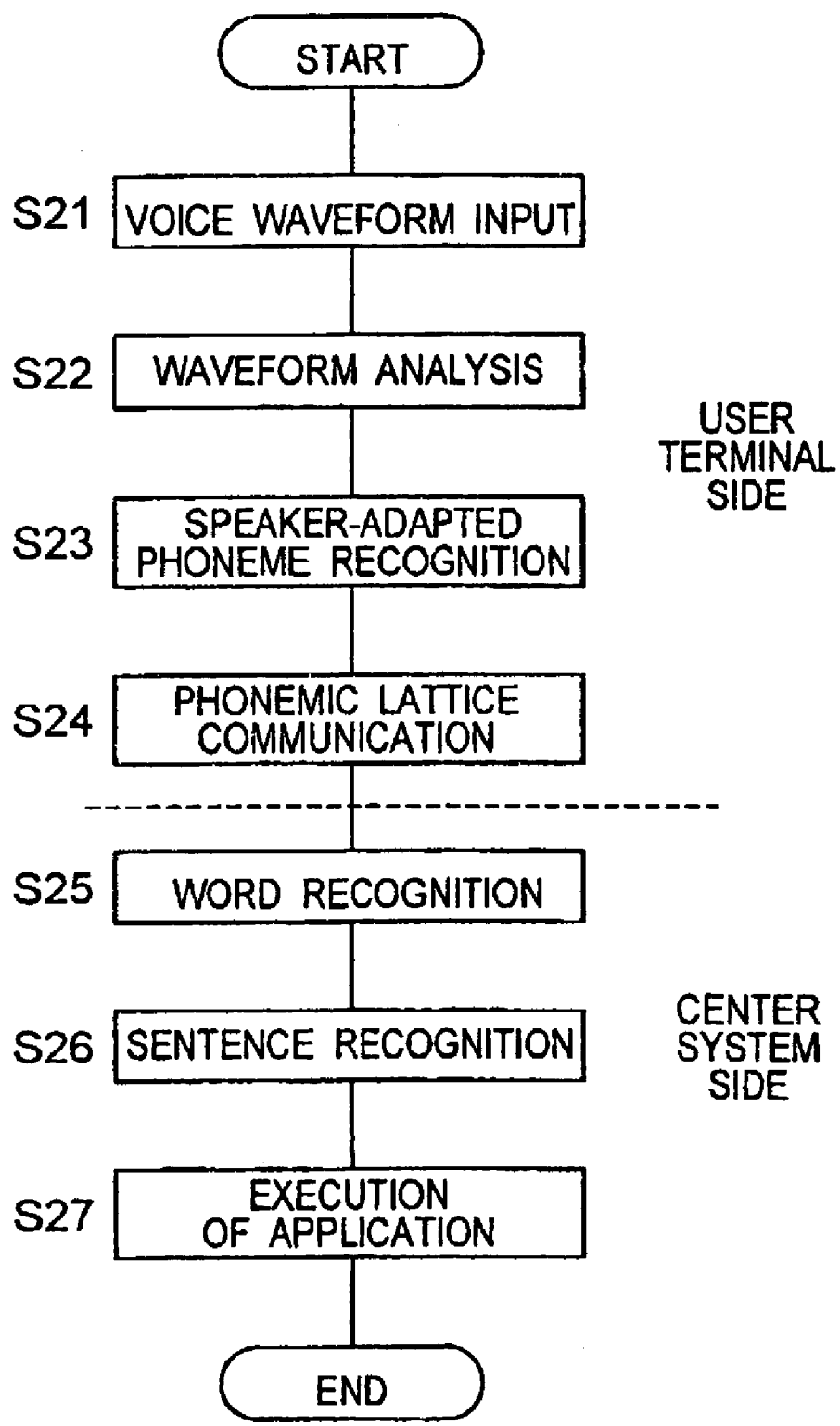
FIG. 3 is a flow chart showing voice recognition/information processing operation by the voice-input communication system shown in FIG. 2.

FIG. 3 is a flow chart showing voice recognition/information processing operation conducted by the user terminal 11 and the center system 12 in the voice-input communication system having the above configuration. Hereinbelow, detailed description will be given of the voice recognition/information processing operation with reference to FIG. 3. It is noted that the step S21 to the step S24 are processing operation on the user terminal 11 side, while the S25 to the step S27 are processing operation on the center system 12 side.

Figure 4:
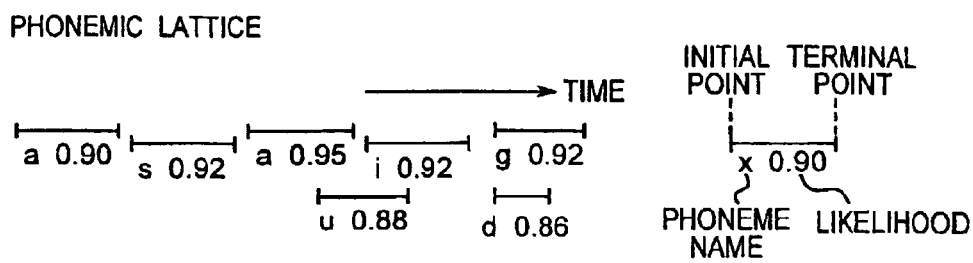
FIG. 4 is a view showing an exemplary phonemic lattice generated by a phoneme recognition means shown in FIG. 2.

In the step S21, a voice waveform by phonation of a user is inputted into the phoneme recognition portion 15 of the user terminal 11. In the step S22, waveform analysis of the inputted voice waveform is carried out by the phoneme recognition portion 15 to obtain a sound parameter time series such as cepstrum and power. Further in the step S23, based on the obtained sound parameter time series, a phoneme is recognized by a speaker-adapted phoneme recognition method with high recognition capability. Then, as a result of phoneme recognition, there is obtained a phonemic lattice (a phoneme name and a likelihood of a recognition candidate, initial point time, final point time, etc.) as shown in FIG. 4. In the step S24, the phonemic lattice is transmitted to the center system 12 through the communication line 13 by the communication control portion 16.

Figure 5:
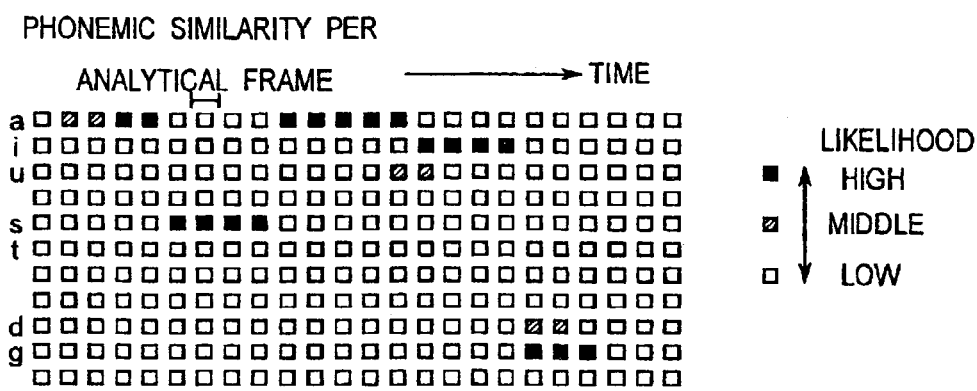
FIG. 5 is a view showing an exemplary time series of phonemic similarity per analytical frame.
Figure 6:
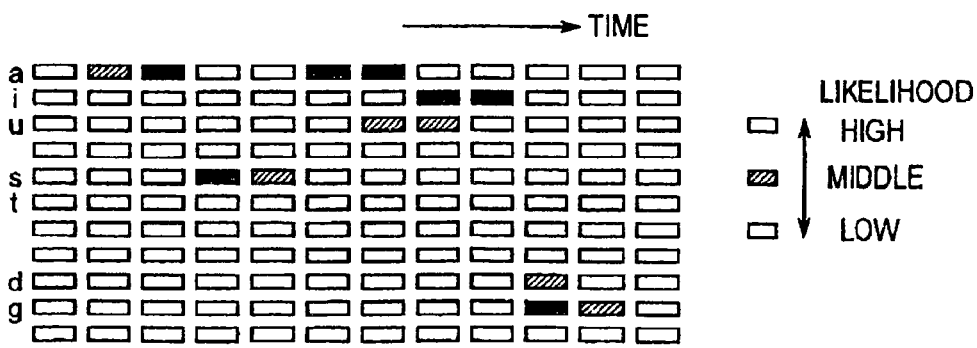
FIG. 6 is a view showing an exemplary time series of an average phonemic similarity per set of sequenced plural analytical frames.

It is noted that in the present embodiment, the phonemic lattice is transmitted. However, with increase of a communication speed in the communication line 13, a time series of phonemic similarity per analytical frame as shown in FIG. 5 may be generated and transmitted instead of the phonemic lattice. Possibly, a time series of average phonemic similarity per set of sequenced plural analytical frames as shown in FIG. 6 may be generated and transmitted. In that case, a data amount becomes larger than that in the case of transmitting a phonemic lattice, though a processing load of the phoneme recognition portion 15 may be reduced. Therefore, it is preferably used in the case where the user terminal 11 is low in processing capability.

In the step S25, the phonemic lattice transmitted through the communication line 13 is received by the control portion 17 of the center system 12 and transmitted to the language processing portion 18. Then, the phonemic lattice is analyzed by the language processing portion 18 with reference to the lexical grammar data stored in the lexical grammar memory 19, and thereby a word phonated by a user is recognized. Further in the step S26, a sentence phonated by the user is recognized based on the above-recognized word. Then, thus-recognized sentence is returned to the control portion 17 as the voice instruction content. In the step S27, an application program corresponding to the content of the received instruction sentence is executed by the control portion 17. After that, the voice recognition/information processing operation is terminated.

Here, the lexical grammar data stored in the lexical grammar memory 19 is given in the form of a word network (Japanese Patent Laid-Open Publication HEI No. 8-6589) in which phonemic transcription as lexical data and a word name as grammar data are used as an arc, or in the form of word n-gram (n word set).

Thus in the present embodiment, when a voice instruction to the user terminal 11 by a user is transmitted to the center system 12 through the communication line 13, voice waveform analysis and phoneme recognition among voice waveform analysis, phoneme recognition, word recognition, and sentence recognition are performed on the user terminal 11 side, while word recognition and sentence recognition (language processing) are performed on the center system 12 side. This implements reduction of a recognition processing load of the user terminal 11, which makes it possible to recognize phonemes of voice instructions of a large lexis correctly and promptly even with the user terminal 11 such as cell phones and PDA that are low in power consumption.

At that point, an interim recognition result such as a phonemic lattice obtained by the phoneme recognition portion 15 of the user terminal 11, a time series of phonemic similarity per analytical frame, or a time series of average phonemic similarity per set of sequenced multiple analytical frames is transmitted to the center system 12 via the communication line 13. Then based on the received interim recognition result, word recognition and sentence recognition are conducted by the language processing portion 18 of the center system 12. Therefore, distortion does not occur in data transmitted via the communication line 13, and therefore high recognition capability may be implemented.

Third Embodiment

Figure 7:
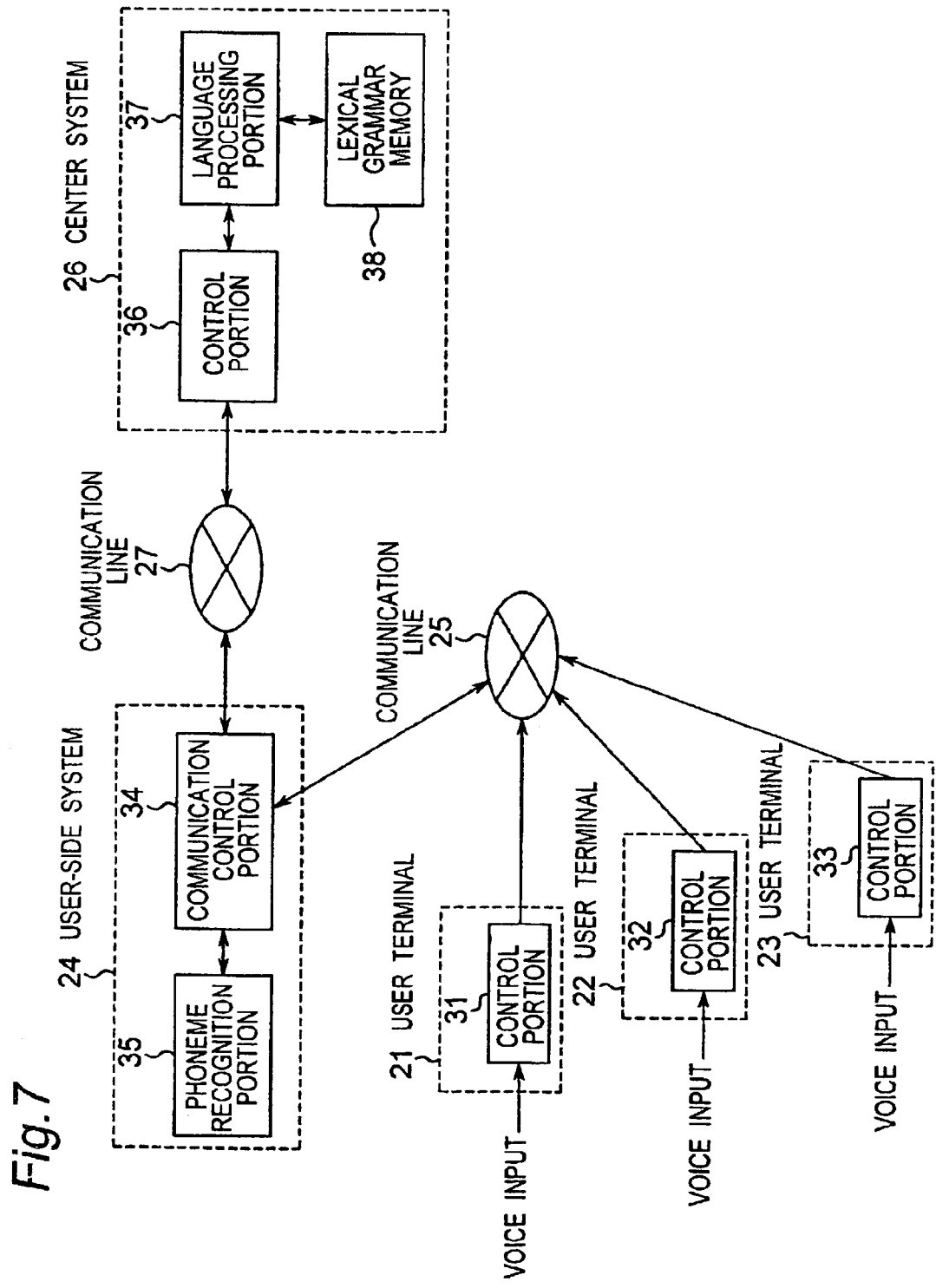
FIG. 7 is a concrete block diagram different from that of FIG. 2 showing the voice-input communication system of FIG. 1.

FIG. 7 is a block diagram showing another concrete example of the voice-input communication system of the first embodiment. In the voice-input communication system in the present embodiment, the function of the user system 1 in the first embodiment is allotted to user terminals 21, 22, 23 and a user-side system 24, and a center system 26 is an equivalence of the center system 2 of the first embodiment.

An instruction by voice is inputted into each of the user terminals 21, 22, 23. Also, the user-side system 24, which is connected to each of the user terminals 21, 22, 23 via a communication line (wired or wireless LAN) 25, performs voice recognition and outputs an interim recognition result. Also, the center system 26, which is connected to the user-side system 24 via a communication line (WAN) 27, recognizes and outputs a voice instruction content.

Each of the user terminals 21, 22, 23 has control portions 31, 32, 33. The control portions 31, 32, 33 digitize inputted voice waveform data and transmits it to the user-side system 24 through the communication line 25. More particularly, the control portions 31, 32, 33 constitute the voice instruction recognition processing means and the transmission control means of the first device in the first embodiment.

The user-side system 24 has a communication control portion 34 and a phoneme recognition portion 35. The communication control portion 34 controls connection between the phoneme recognition portion 35 and the communication lines 25, 27. Also the phoneme recognition portion 35 obtains a sound parameter time series from the voice waveform data received by the communication control portion 34 and recognizes phonemes. More specifically, the phoneme recognition portion 35 constitutes the voice instruction recognition processing means of the second device in the first embodiment, while the communication control portion 34 constitutes the reception control means and the transmission control means 6 of the second device.

The center system 26 has a control portion 36, a language processing portion 37, and a lexical grammar memory 38. The control portion 36 controls connection between the communication line 27 and the center system 26. Also, the language processing portion 37 conducts language processing of a phonemic lattice as a recognition result of the phoneme recognition portion 35 transmitted from the user-side system 24 via the communication line 27 with use of the lexical grammar data stored in the lexical grammar memory 38, and recognizes an instruction sentence voice-inputted into the user terminals 21, 22, 23. Then, the recognition result is returned to the control portion 36. More specifically, the control portion 36 constitutes the reception control means 7 of the first embodiment, while the language processing portion 37 constitutes the voice instruction recognition processing means 5 and the output control means 8.

Figure 8:
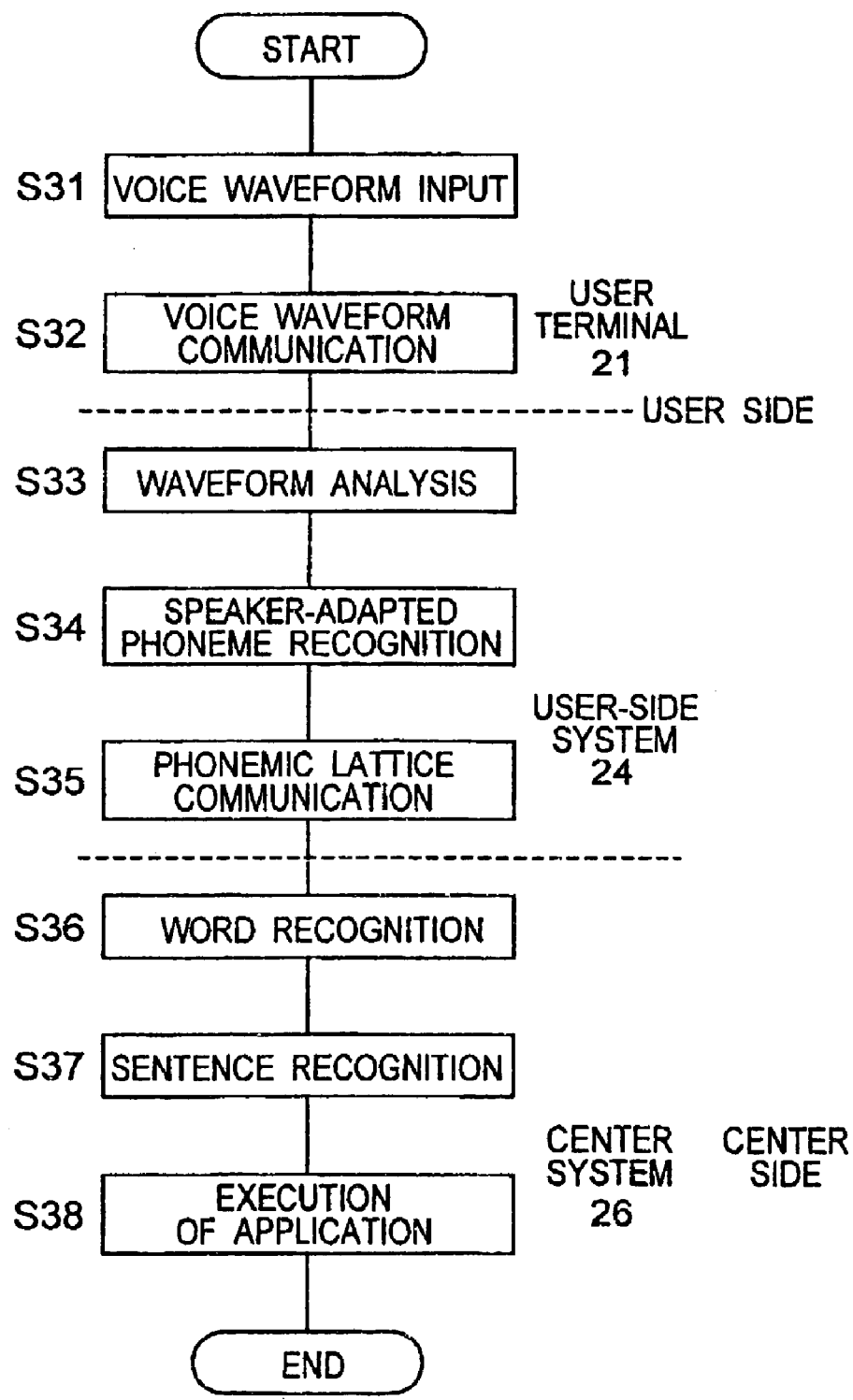
FIG. 8 is a flow chart showing voice recognition/information processing operation by the voice-input communication system shown in FIG. 7.

FIG. 8 is a flow chart showing voice recognition/information processing operation conducted by the user terminals 21 to 23, the user-side system 24, and the center system 26 in the voice-input communication system having the above configuration. Hereinafter, detailed description will be given of the voice recognition/information processing operation with reference to FIG. 8. It is noted that the step S31 and the step S32 are processing operation by any one of the user terminals 21 to 23 (hereinafter stated as the user terminal 21), the step S33 to the step S35 are processing operation by the user-side system 24, and the step S36 to the step S38 are processing operation by the center system 26.

In the step S31, a voice waveform by phonation of a user is inputted into the control portion 31 of the user terminal 21. In the step S32, the inputted voice waveform is transmitted by the control portion 31 to the user-side system 24 through the communication line 25.

In the step S33, the voice waveform data transmitted via the communication line 25 is received by the communication control portion 34 of the user-side system 24, and transmitted to the phoneme recognition portion 35. Then, waveform analysis of the voice waveform is carried out by the phoneme recognition portion 35 to obtain a sound parameter time series such as cepstrum and power. Further in the step S34, based on the obtained sound parameter time series, phonemes are recognized by a speaker-adapted phoneme recognition method with high recognition capability. Then, as a result of phoneme recognition, there is obtained a phonemic lattice. In the step S35, the phonemic lattice is transmitted to the center system 26 through the communication line 27 by the communication control portion 34.

In the step S36, the phonemic lattice transmitted through the communication line 27 is received by the control portion 36 of the center system 26 and transmitted to the language processing portion 37. Then, the phonemic lattice is analyzed by the language processing portion 37 with reference to the lexical grammar data stored in the lexical grammar memory 38, and thereby a word phonated by a user is recognized. Further in the step S37, a sentence phonated by the user is recognized based on the above-recognized word. Then, thus-recognized sentence is returned to the control portion 36 as the voice instruction content. In the step S38, an application program corresponding to the content of the received instruction sentence is executed by the control portion 36. After that, the voice recognition/information processing operation is terminated.

Thus, in the present embodiment, when a voice instruction to the user terminals 21, 22, 23 by a user is transmitted to the center system 26 through the communication lines 25, 37, voice waveform analysis and phoneme recognition among voice waveform analysis, phoneme recognition, word recognition, and sentence recognition are performed on the user-side system 24, while word recognition and sentence recognition are performed on the center system 26 side. Therefore, what each of the user terminals 21, 22, 23 has to conduct is just to transmit inputted voice waveform to the user-side system 24 through the communication line (LAN) 35, which makes it possible to make a processing load of the user terminals 21, 22, 23 in voice recognition processing further smaller than that of the user terminal 11 in the second embodiment.

According to the present embodiment, therefore, further downsizing and weight saving of the user terminals 21, 22, 23 are implemented, thereby enabling establishment of a voice-input communication system more suitable for mobile devices low in power consumption.

Fourth Embodiment

The present embodiment is a modified example of the second embodiment. In the second embodiment, a voice instruction of a user inputted in the user terminal 11 is recognized in phonemic unit by the phoneme recognition portion 15, and the voice instruction of a user is recognized in sentence unit by the language processing portion 18 of the center system 12. Then, an application program corresponding to the recognized instruction sentence is executed.

In that case, however, if the application program relates to execution of readout transmission of interoffice documents, leakage of confidential documents to the outside is naturally predictable. Also, if the program relates to banking service (cash transfer, money transfer, balance inquiry, and funds transfer notification), leakage of personal information to other people is predicted. Accordingly in the present embodiment, speaker recognition is performed on the center system side for identifying the user who inputted a voice instruction into a user terminal.

The speaker recognition is available in a phonation content dependent type in which words for use in speaker recognition are predetermined and an independent type in which any word can be phonated. Generally, the former has predetermined subject keywords, so that a burden of a speaker is small and a recognition rate is high. However, if characteristic patterns of a registered speaker is recorded, this type is absolutely useless. The latter is strong in the above problem, but a speaker needs to phonate a number of words, so that a large burden is imposed on the speaker. Accordingly in the present embodiment, adopted is a text-specified speaker recognition method in which every time different phonation words are specified by the speaker recognition device side.

Figure 9:
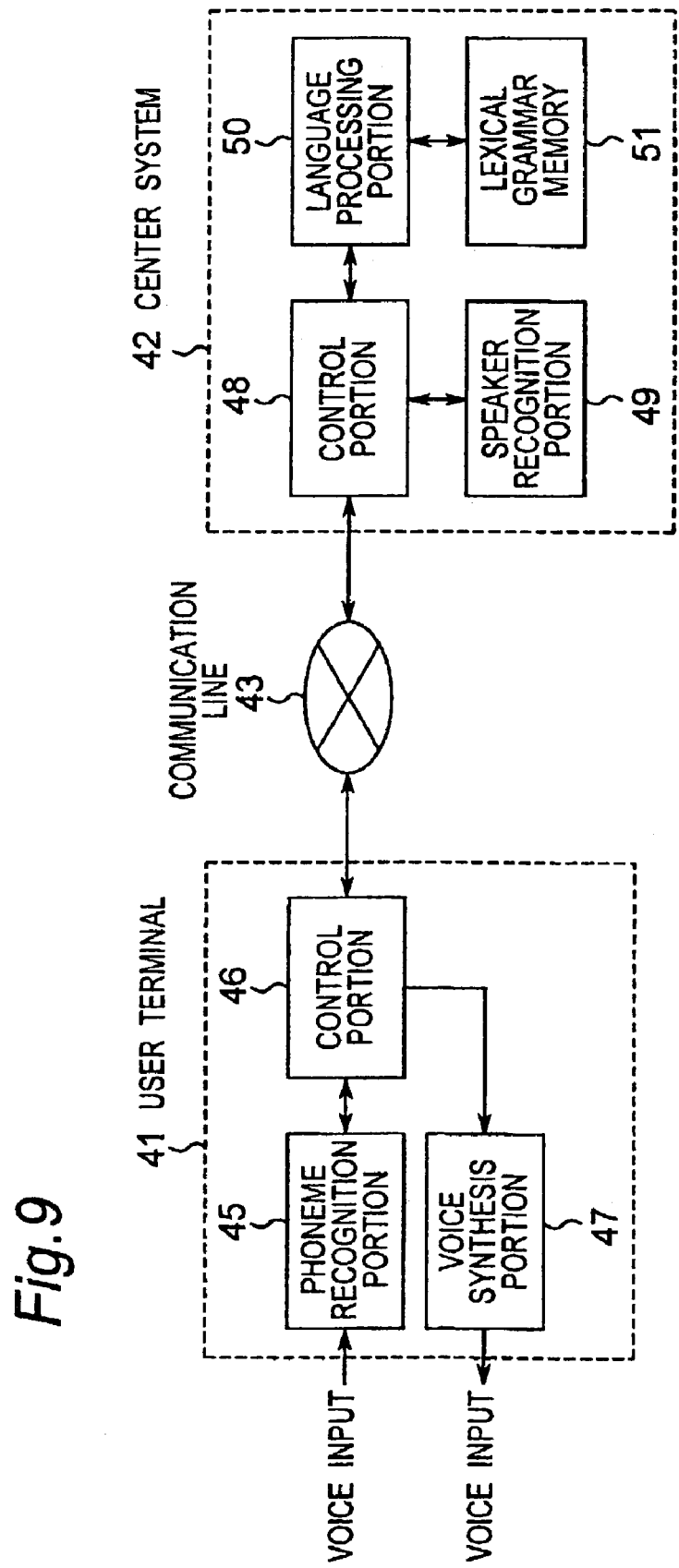
FIG. 9 is a concrete block diagram showing a voice-input communication system different from FIG. 2 and FIG. 7.

FIG. 9 is a block diagram showing a voice-input communication system in the present embodiment. As with the case of the second embodiment, the voice-input communication system in the present embodiment is composed of a user terminal 41 and a center system 42 that are connected to each other through a communication line 43.

The user terminal 41 is for inputting instructions by voice and for outputting an interim recognition result. The center system 42 is for recognizing and outputting a voice instruction content. In addition, the center system 42 generates text information for phonation for performing text-specified speaker recognition, and transmits it to the user terminal 41. The user terminal 41 synthesizes a voice based on the text information from the center system 42 and outputs it.

The user terminal 41 has a phoneme recognition portion 45, a control portion 46, and a voice synthesis portion 47. The phoneme recognition portion 45 obtains a sound parameter time series from an inputted voice for recognizing phonemes. Further, voice characteristics of a speaker (pitch frequency, long-time spectrum, etc.) are extracted. The voice synthesis portion 47 synthesizes a voice based on voice synthesis control parameters and outputs it. Also, the control portion 46 transmits a recognition result of phonemes from the phoneme recognition portion 45 and voice characteristics of a speaker to the center system 42 side through the communication line 43, while receiving a time series of the voice synthesis control parameters transmitted through the communication line 43 and transmitting it to the voice synthesis portion 47.

The center system 42 has a control portion 48, a speaker recognition portion 49, a language processing portion 50, and a lexical grammar memory 51. The control portion 48 controls connection between the communication line 43 and the center system 42, and executes an application program corresponding to a voice instruction inputted from the user terminal 41.

The speaker recognition portion 49 determines a text that a user should phonate, generates voice synthesis control parameters of the text and transmits them to the control portion 48. Further, based on the voice characteristics of a speaker corresponding to the text extracted by the phoneme recognition portion 45, the speaker recognition portion 49 conducts speaker recognition and identifies a person inputting the voice instruction. The language processing portion 50 performs language processing of a phonemic lattice as a phoneme recognition result transmitted from the user terminal 41 via the communication line 43 with use of the lexical grammar data stored in the lexical grammar memory 51, and recognizes an instruction sentence inputted by voice into the phoneme recognition portion 45. Then the recognition result is returned to the control portion 48.

Consequently, the control portion 48 conducts evaluation of a recognized speaker including whether the recognized speaker is a registered speaker, and whether the recognized speaker matches with a nominal person of an account specified by a recognized instruction sentence, and if the speaker is determined to be a correct speaker, the control portion 48 executes an application program.

Figure 10:
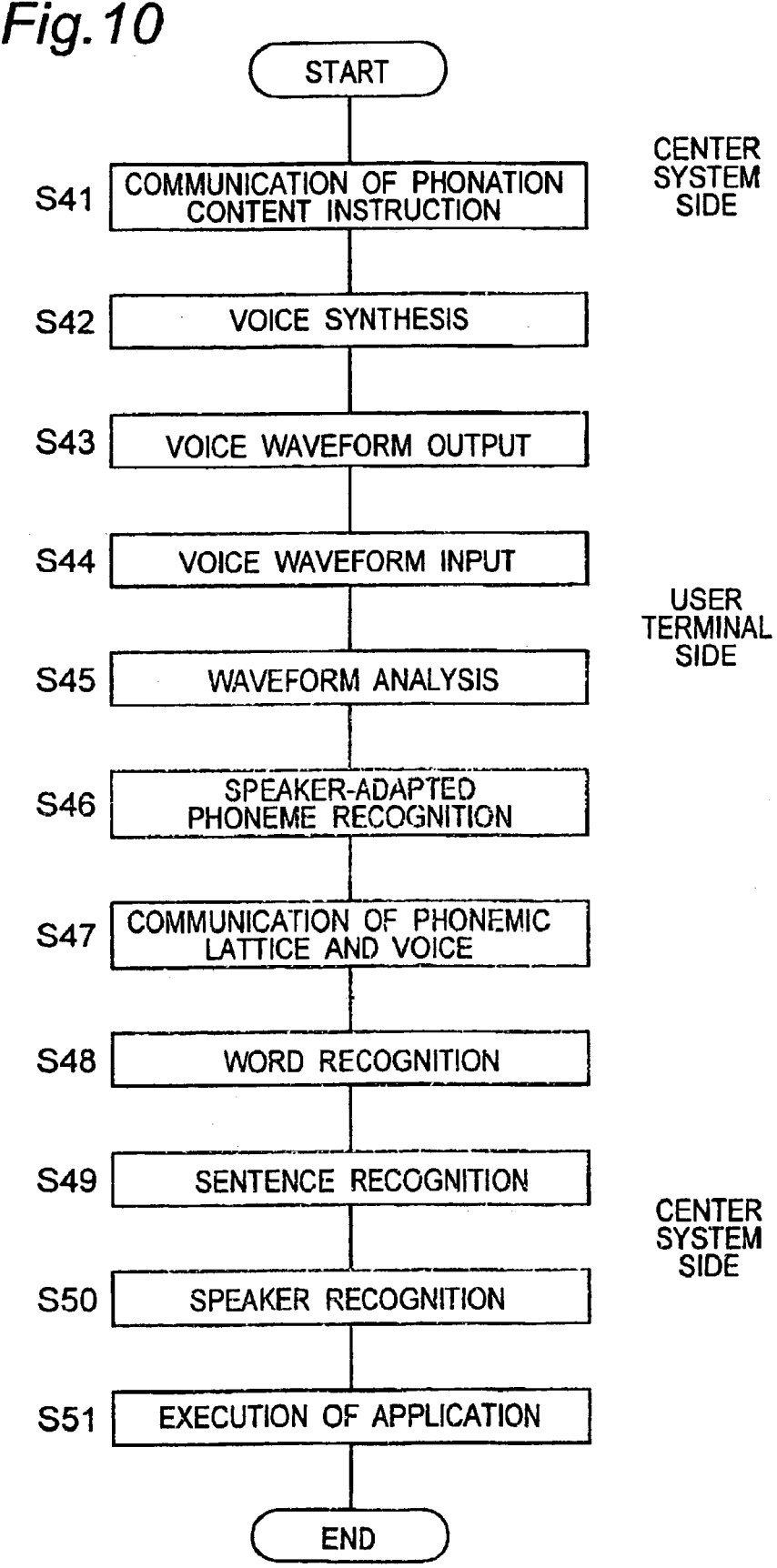
FIG. 10 is a flow chart showing voice recognition/information processing operation by the voice-input communication system shown in FIG. 9.
Figure 11:
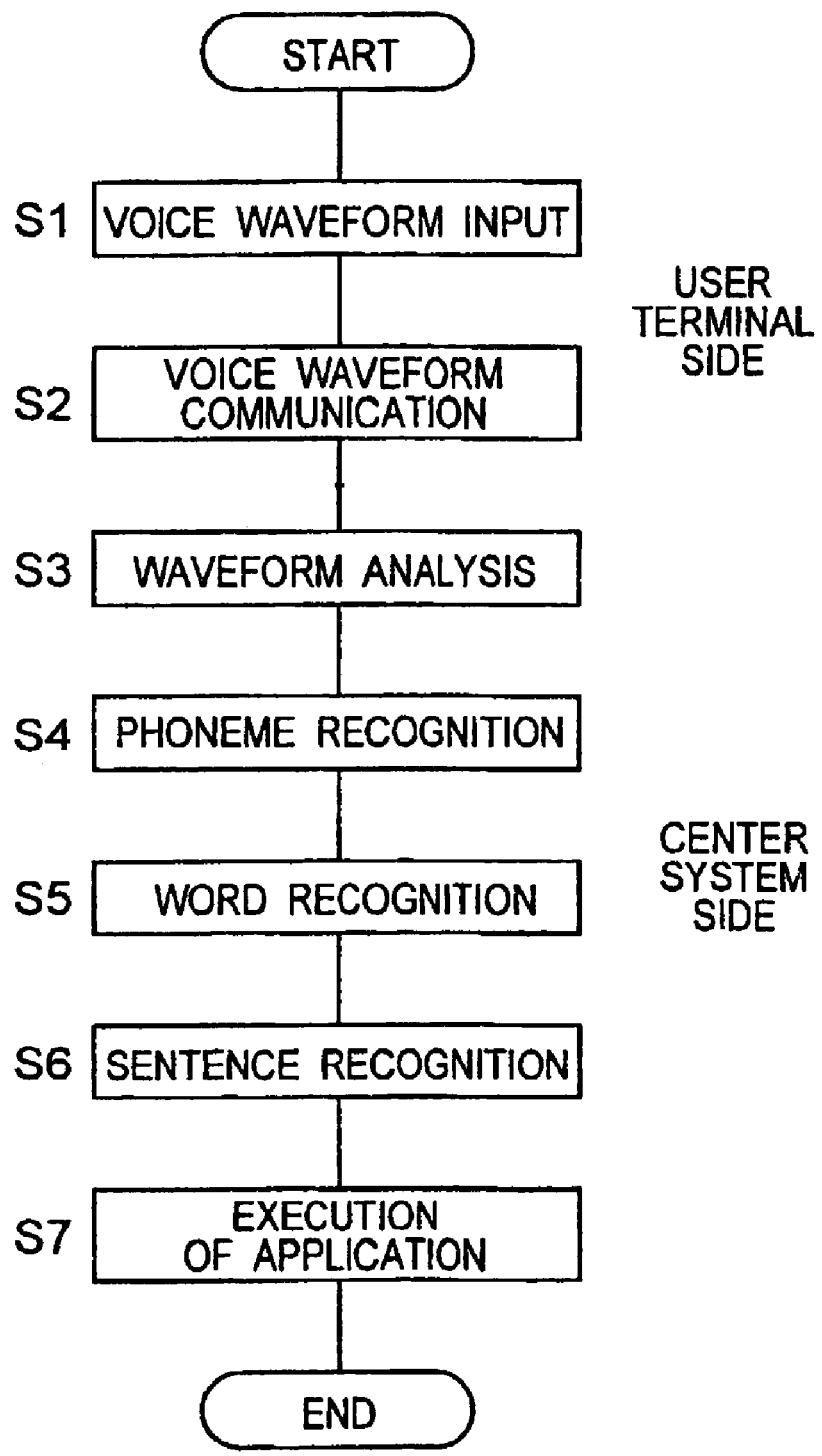
FIG. 11 is a flow chart showing voice recognition/information processing operation by a conventional voice-input information processing system.
Figure 12:
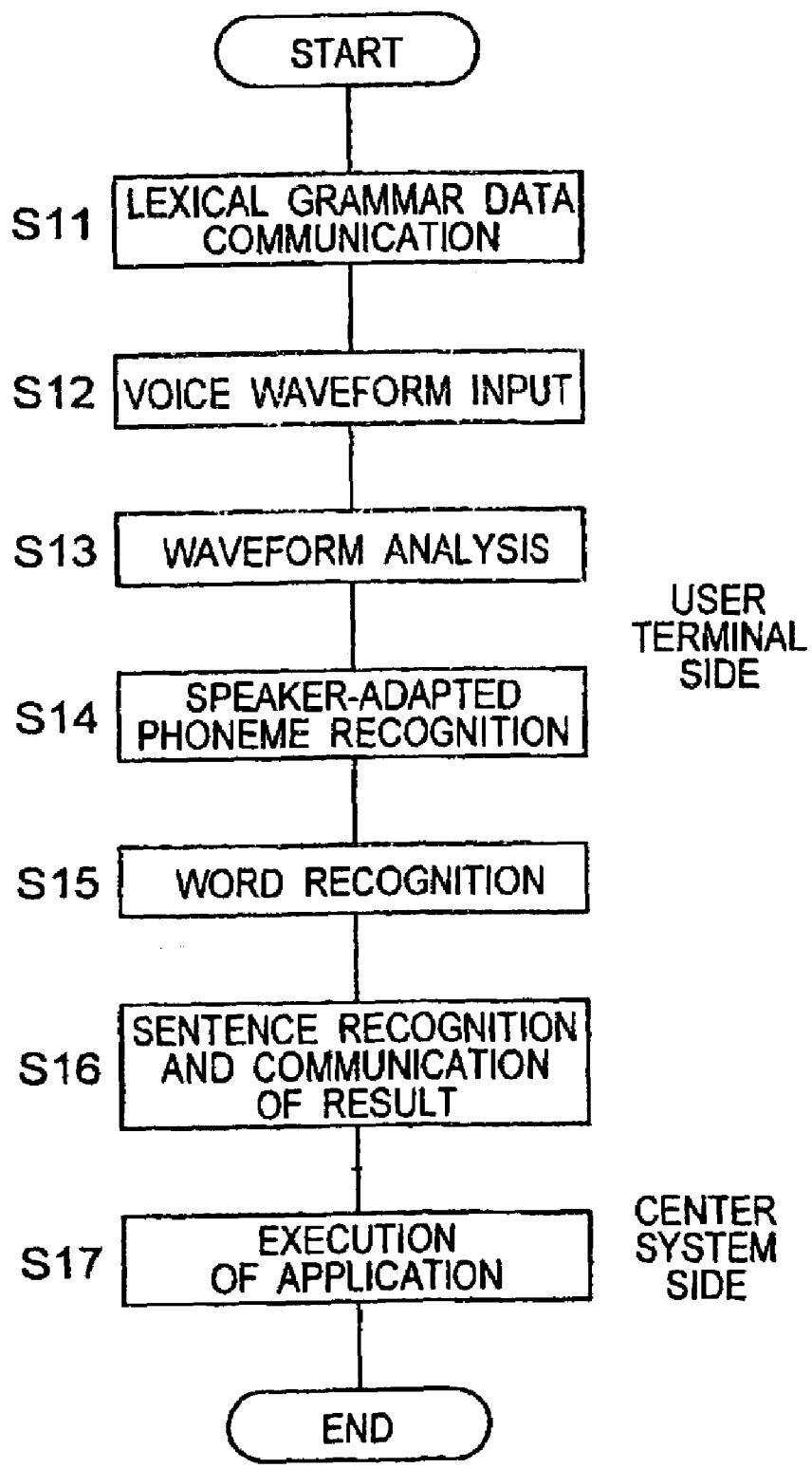
FIG. 12 is a flow chart showing voice recognition/information processing operation by a conventional voice-input information processing system different from FIG. 11.

FIG. 10 is a flow chart showing voice recognition/information processing operation conducted by the user terminal 41 and the center system 42 in the voice-input communication system having the above configuration. Hereinafter, detailed description will be given of the voice recognition/information processing operation with reference to FIG. 10. It is noted that the step S41 is processing operation on the center system side, the step S42 to the step S47 are processing operation on the user terminal 41 side, and the step S48 to the step S51 are processing operation on the center system 42 side.

In the step S41, a phonation content for a user is determined by the speaker recognition portion 49 of the center system 42, and voice synthesis control parameters (Vowel-Consonant-Vowel (VCV) unit string, pitch, basic intonation, accent, etc.) for a proper phonation content are generated and transmitted to the control portion 48. Then, the voice synthesis control parameters are transmitted by the control portion 48 to the user terminal 41 through the communication line 43. It is noted that determination of a phonation content by the speaker recognition portion 49 in that case is carried out by, for example, selecting one word string at random from characteristic patterns registered per word string for each speaker.

In the step S42, the voice synthesis control parameters transmitted through the communication line 43 are received by the control portion 46 of the user terminal 41, and transmitted to the voice synthesis portion 47. Then, voice synthesis is performed by the voice synthesis portion 47 based on the voice synthesis control parameters. In the step S43, a voice waveform of the obtained phonation content is outputted by the voice synthesis portion 47. More specifically, a synthetic voice with the phonation content (text) is outputted.

In the step S44, the phonation content (text) voice-outputted in the step S43 is phonated and then a voice instruction is phonated by a user. Thus, a voice waveform by phonation of a user is inputted into the phoneme recognition portion 45. In the step S45, waveform analysis of the inputted voice waveform is performed by the phoneme recognition portion 45 to obtain a sound parameter time series such as cepstrum, power, and pitch frequency. Further in the step S46, based on the obtained sound parameter time series, a phoneme is recognized by a speaker-adapted phoneme recognition method with high recognition capability. Then, as a phoneme recognition result, a phonemic lattice is obtained. In the step S47, the phonemic lattice and voice characteristics (pitch frequency, long-time spectrum, etc.) are transmitted by the control portion 46 to the center system 42 through the communication line 43.

It is noted that in the present embodiment, the time series of phonemic similarity per analytical frame and the time series of average phonemic similarity per set of sequenced plural analytical frames may be generated and transmitted instead of the phonemic lattice.

In the step S48, the phonemic lattice and the voice characteristics transmitted via the communication line 43 are received by the control portion 48 of the center system 42, and the phonemic lattice is transmitted to the language processing portion 50. Then, the phonemic lattice is analyzed by the language processing portion 50 with reference to the lexical grammar data stored in the lexical grammar memory 51, and a word phonated by a user is recognized. Further in the step S49, a sentence phonated by a user is recognized based on the recognized word. Then, the recognized sentence is returned to the control portion 48 as the voice instruction content.

In the step S50, a word string of the phonation content (text) is retrieved from a beginning of the received instruction sentence by the control portion 48, and if the word string of the phonation content (text) is found, voice characteristics of the phonation content (text) portion are transmitted to the speaker recognition portion 49. Then, speaker recognition is carried out by the speaker recognition portion 49 based on the proper voice characteristics. In the step S51, evaluation of the recognized speaker is conducted by the control portion 48. If the speaker is a correct speaker, there is executed an application program for readout transmission of interoffice documents, banking service, electronic commerce and the like conforming to the content of the received instruction sentence. After that, voice recognition/information processing operation is terminated.

In the present embodiment as described above, an interim recognition result of a voice instruction to the user terminal 41 by a user is transmitted to the center system 42, and prior to recognition of the instruction sentence of the user on the center system 42 side, a phonation content to the user is determined by the speaker recognition portion 49 of the center system 42 to generate voice synthesis control parameters and transmit them to the user terminal 41. Then, in the voice synthesis portion 47 of the user terminal 41, a synthetic voice with the phonation content is outputted based on the received voice synthesis control parameters. Further, characteristics of a voice phonated by the user conforming to the phonation content by the synthetic voice are transmitted to the center system 42, and speaker recognition is performed based on the voice characteristics received in the speaker recognition portion 49 of the center system 42.

According to the present embodiment, therefore, a text-specified speaker recognition may be performed by the user terminal 41 and the center system 42 through the communication line 43, thereby enabling establishment of a voice-input communication system with high security applicable to banking service, electronic commerce, and the like.

At that point, processing with a large load such as text analysis including syntactic parsing, concatenation in VCV units, and generation of voice synthesis control parameters is performed on the center system 42 side. This makes it possible to reduce a voice synthesis processing load of the user terminal 41, thereby enabling voice-input communication with high security with use of the user terminal 41 such as cell phones and PDA that are low in power consumption.

Although in the fourth embodiment, the voice synthesis portion 47 and the speaker recognition portion 49 are structured to be disposed on the user terminal 11 and the center system 12 of the second embodiment, they may be structured to be disposed on the user terminal 21 to the user terminal 23 and on the center system 26 of the third embodiment.

Also in the third and fourth embodiments, there is described a case where the user system 1 of the first embodiment is divided into plurality with a function of the incorporated voice instruction recognition processing means 4 as a unit. However, as described above, the center system 2 may be divided in plurality with a function of the incorporated voice instruction recognition processing means 5 as a unit. Also, other processing systems may be added.

As an example in that case, it is considered to structure the center system 2 of the first embodiment from a first center system incorporating a language processing portion and a lexical grammar memory, and a second center system incorporating a Japanese-English machine translation processing device. In this case, a Japanese sentence phonated by a user recognized in the first center system may be translated to an English sentence in the second center system. This makes it possible to directly transmit messages to a center system of a foreign country with a cell phone via a communication line such as WAB even if a user does not speak language of a destination country.

Possibly, the center system 2 of the first embodiment is structured from a first center system incorporating a language processing portion and a lexical grammar memory and a second center system to n center system incorporating different application program execution portion. The first center system can identify a center system incorporating an application program execution portion that executes a proper instruction from the content of a recognized instruction sentence, and transfer the instruction sentence to the center system for execution.

Possibly, the center system 2 of the first embodiment is structured from a plurality of center systems incorporating a language processing portion, a lexical grammar memory, and an execution processing portion of a different application program. Upon reception of an interim recognition result, each center system may simultaneously start recognition of an instruction sentence, and the center system who determines that the instruction is not to itself may terminate the subsequent processing, while the center system who determines that the instruction is to itself may execute an application program.

Although in each of the embodiments, a phoneme is used as a voice recognition unit, a syllable is naturally usable.

As is clear from the above description, in the voice-input communication system of the present invention, in instructing by voice from a user terminal of a user system to a center system through a first communication line, a voice instruction recognition processing means for recognizing an instruction content from a waveform analysis result of an inputted voice instruction is divided in function unit including voice recognition, word recognition, and sentence recognition, and individual partial voice instruction recognition processing means are dispersed to and held by the user system and the center system, which eliminates necessity of transmitting an inputted voice waveform from the user system to the center system like the case of disposing all the functions of the voice instruction recognition processing means on the center system side. This makes it possible to prevent reduction of a recognition rate due to transmission distortion of the voice waveform. In addition, unlike the case of disposing all the functions of the voice instruction recognition processing means on the user system, there is no need of transmitting lexical grammar data from the center system to the user system. This eliminates waiting time due to transmission of the lexical grammar data whenever the voice instruction is changed, thereby implementing prompt recognition of the voice instruction content. Further, a processing load of the user system may be decreased.

Also, in the voice-input communication system in one embodiment of the invention, the user system is provided with a user-side system connected to a user terminal through a second communication line, so that the partial voice instruction recognition processing means held by the user system is further dispersed to and held by the user terminal and the user-side system. This enables further decrease of a processing load of the user terminal, and enables the user terminal to sufficiently accept voice instruction sentences with a large lexis even if the user terminal is a mobile device such as cell phones and PDA that are low in power consumption.

Also in the voice-input communication system in one embodiment of the invention, a plurality of the center systems are provided and each center system is connected via a third communication line, so that the partial voice instruction recognition processing means held by the center system may be further dispersed to and held by a plurality of the center systems. Also, the center system for executing voice instruction recognition processing may be isolated from the center system for performing application processing in conformity with a recognized instruction content. In addition, instruction by voice may be given from the user terminal to different center systems.

Also in the voice-input communication system in one embodiment of the invention, at least a final-stage center system is provided with an output control means for outputting an instruction content obtained by the voice instruction recognition processing means, which makes it possible to execute various application programs and the like corresponding to the instruction content at least in the final-stage center system.

Also in the voice-input communication system in one embodiment of the invention, either the user terminal or the user-side system in the user system is composed of a voice recognition means as the partial voice instruction recognition processing means and a transmission control means, so that an interim recognition result of an inputted voice may be transmitted from the user system to the center system. Accordingly, compared to the case of directly transmitting a voice waveform, the interim recognition result with less transmission distortion may be transmitted, which may prevent a recognition rate from decreasing.

Also, in the voice-input communication system in one embodiment of the invention, at least one center system is provided with a lexical grammar memory for storing lexical grammar and a language processing means as the partial voice instruction recognition processing means, which makes it possible to perform language processing of the interim recognition result from the user system to obtain a linguistically-correct instruction content from which wrong recognition candidates are removed. Therefore, a correct instruction content of a voice instruction inputted into the user terminal may be attained.

Also, in the voice-input communication system in one embodiment of the invention, the voice recognition means is a phoneme recognition means or a syllable recognition means, and the interim recognition result is a phonemic lattice or a syllabic lattice, which makes it possible to easily obtain the interim recognition result as a phonemic lattice or a syllabic lattice with less transmission distortion compared to the case of transmitting a voice waveform.

Also in the voice-input communication system in one embodiment of the invention, as the interim recognition result, a phonemic similarity series per analytical frame or an average phonemic similarity series per set of sequenced multiple analytical frames is used instead of the phonemic lattice, so that a processing load of the phoneme recognition means may be decreased. Therefore, the phoneme recognition means may be mounted on a user terminal low in processing capability.

Also in the voice-input communication system in one embodiment of the invention, the first communication line is different in kind from the second and third communication lines, so that, for example, the first communication line is set to WAN and the second and the third communication lines are set to LAN to make it possible to instruct by voice from a different user terminal in a branch office to a different center system in a head office in Tokyo.

Also in the voice-input communication system in one embodiment of the invention, at least one center system is provided with a phonation instruction means for transmitting voice synthesis control parameters for a phonation content to be phonated by a user and a speaker recognition means for recognizing a speaker based on the characteristics of an inputted voice extracted in the user system, while the user terminal of the user system is provided with a voice synthesis means for creating a synthetic voice with the phonation content based on the voice synthesis control parameters, and either the user terminal or the user-side system is provided with a waveform analysis means for extracting and transmitting characteristics of an inputted voice, which makes it possible to perform text-specified speaker recognition by the user system and the center system via the first communication line prior to recognition of the voice instruction by a user to the user terminal in the center system.

Therefore, only in the case of a voice instruction by a specified user, processing in conformity with the proper voice instruction may be executed, thereby enabling establishment of a voice-input communication system with high security applicable to baking service, electronic commerce, and the like.

Also a user terminal of the invention is provided with a phoneme recognition means for recognizing an inputted voice per phoneme and creating a phonemic lattice, and a transmission control means for transmitting the phonemic lattice through a communication line, so that the phonemic lattice that is an interim recognition result may be transmitted. Therefore, a recognition rate of an inputted voice will not decrease due to transmission distortion unlike the case of transmitting an inputted voice waveform through the communication line.

Also, a center system of the present invention is composed of a reception means for receiving a phonemic lattice transmitted from a user system through a communication line and a language processing means for performing language processing of the phonemic lattice with use of the lexical grammar, so that a recognition rate of an inputted voice will not decrease due to transmission distortion unlike the case of performing voice waveform analysis, phoneme recognition, and language processing of an inputted voice waveform transmitted through the communication line.

The invention claimed is:

1. A voice-input communication system having a user system with a user terminal and a center system being connected to the user system through a first communication line for sending an instruction from the user terminal to the center system, the voice-input communication system comprising:

voice instruction recognition processing means composed of a plurality of partial voice instruction recognition processing means having different functions for recognizing an instruction content from a result of waveform analysis of an inputted voice instruction;

phonation instruction means for creating a voice synthesis control parameter for a phonation content to be phonated by a user and transmitting the parameter to the user system;

voice synthesis means for creating a synthetic voice with the phonation content based on the voice synthesis control parameter;

waveform analysis means provided for extracting characteristics of an inputted voice through analysis of a waveform of the inputted voice; and speaker recognition means for recognizing a speaker based on the characteristics of the inputted voice, wherein the plurality of the partial voice instruction recognition processing means are dispersed to the user system and the center system.

2. The voice-input communication system as defined in claim 1, wherein the user terminal comprises:

phoneme recognition means for recognizing an inputted voice per phoneme and creating a phonemic lattice; and transmission control means for transmitting the phonemic lattice through a communication line.

3. A The voice-input communication system as defined in claim 1, wherein the center system comprises:

reception means for receiving a phonemic lattice transmitted through the communication line;

a lexical grammar memory for storing lexical grammar; and language processing means for performing language processing of the phonemic lattice with use of the lexical grammar.

4. The voice-input communication system as defined in claim 1, wherein the user system is provided with a user-side system connected to the user terminal through a second communication line, and the user-side system is connected to the center system through the first communication line.

5. The voice-input communication system as defined in claim 4, wherein either the user terminal or the user-side system in the user system is provided with voice recognition means as the partial voice instruction recognition processing means for recognizing an inputted voice and outputting an interim recognition result, and provided with transmission control means for transmitting the interim recognition result to the center system through the first communication line.

6. The voice-input communication system as defined in claim 5, wherein at least one center system comprises:

a lexical grammar memory for storing lexical grammar; and language processing means as the partial voice instruction recognition processing means for performing language processing of the interim recognition result from the user system with use of the lexical grammar.

7. The voice-input communication system as defined in claim 6, wherein the voice recognition means is phoneme recognition means, and the interim recognition result is a phonemic lattice.

8. The voice-input communication system as defined in claim 7, wherein as the interim recognition result, a phonemic similarity series per analytical frame or an average phonemic similarity series per set of sequenced multiple analytical frames is used instead of the phonemic lattice.

9. The voice-input communication system as defined in claim 6, wherein the voice recognition means is syllable recognition means, and the interim recognition result is a syllabic lattice.

10. The voice-input communication system as defined in claim 5, wherein the voice recognition means is phoneme recognition means, and the interim recognition result is a phonemic lattice.

11. The voice-input communication system as defined in claim 10, wherein as the interim recognition result, a phonemic similarity series per analytical frame or an average phonemic similarity series per set of sequenced multiple analytical frames is used instead of the phonemic lattice.

12. The voice-input communication system as defined in claim 5, wherein the voice recognition means is syllable recognition means, and the interim recognition result is a syllabic lattice.

13. The voice-input communication system as defined in claim 1, comprising:

a plurality of the center systems, each of which is connected through a third communication line.

14. The voice-input communication system as defined in claim 13, wherein at least a final-stage center system is provided with output control means for outputting an instruction content recognized by the voice instruction recognition processing means.

15. The voice-input communication system as defined in claim 13, wherein the first communication line is different in kind from the second and third communication lines.

16. The voice-input communication system as defined in claim 4, wherein the first communication line is different in kind from the second and third communication lines.

17. The voice-input communication system as defined in claim 4, wherein the phonation instruction means is provided on at least one center system and the parameter is transmitted to the user system through the first communication line;

the voice synthesis means is provided on the user terminal in the user system;

the waveform analysis means is provided on either the user terminal or the user-side system in the user system and the characteristics are transmitted to the center system through the first communication line; and the speaker recognition means is provided on the center system equipped with the phonation instruction means.

18. The voice-input communication system as defined in claim 4, wherein the partial voice instruction recognition processing means retained by the user system are dispersed between and held by the user terminal and the user-side system.

* * * * *